United States Patent [19]
Lapierre

[11] Patent Number: 4,702,842
[45] Date of Patent: Oct. 27, 1987

[54] APPARATUS FOR REVERSE OSMOSIS USING FLUID RECIRCULATION

[76] Inventor: Donald Lapierre, 1900, 127 ième rue, St. Georges de Beauce (Québec), Canada, G5Y 2W8

[21] Appl. No.: 3,867

[22] Filed: Jan. 16, 1987

[51] Int. Cl.[4] ............................................. B01D 13/00
[52] U.S. Cl. .................................. 210/651; 210/652; 210/416.1
[58] Field of Search ................... 210/651, 652, 321.1, 210/416.1, 433.2

[56] References Cited

U.S. PATENT DOCUMENTS

| | | | |
|---|---|---|---|
| 4,070,280 | 1/1978 | Bray | 210/234 |
| 4,172,033 | 10/1979 | Willock | 210/91 |
| 4,178,240 | 12/1979 | Pinkerton | 210/22 A |
| 4,197,196 | 4/1980 | Pinkerton | 210/22 A |
| 4,288,326 | 9/1981 | Keefer | 210/416.1 X |
| 4,321,137 | 3/1982 | Kohler | 210/416.1 X |
| 4,395,130 | 7/1983 | Kutowy | 366/137 |

FOREIGN PATENT DOCUMENTS

| | | | |
|---|---|---|---|
| 565930 | 11/1958 | Canada | 210/416.1 |
| 569285 | 1/1959 | Canada | 210/416.1 |
| 574816 | 4/1959 | Canada | 210/416.1 |
| 588457 | 12/1959 | Canada | 210/416.1 |
| 623140 | 7/1961 | Canada | 210/416.1 |
| 634944 | 1/1962 | Canada | 210/416.1 |
| 664418 | 6/1963 | Canada | 210/416.1 |
| 679875 | 2/1964 | Canada | 210/416.1 |
| 713837 | 7/1965 | Canada | 210/416.1 |
| 781753 | 4/1968 | Canada | 210/416.1 |
| 783942 | 4/1968 | Canada | 210/416.1 |
| 809422 | 4/1969 | Canada | 210/416.1 |
| 855975 | 11/1970 | Canada | 210/416.1 |
| 979374 | 12/1975 | Canada | 210/321.1 |
| 1030074 | 4/1978 | Canada | 210/321.1 |
| 1040544 | 10/1978 | Canada | 210/321.1 |
| 1050439 | 3/1979 | Canada | 210/639 |
| 1081539 | 7/1980 | Canada | 210/416.1 |
| 1119970 | 3/1982 | Canada | 210/416.1 |

*Primary Examiner*—Frank Spear
*Attorney, Agent, or Firm*—Robic, Robic & Associates

[57] ABSTRACT

A membrane element pumping and circulation mechanism comprising a pressure vessel containing a centrifugal pumping mechanism and a membrane module wherein aqueous fluid to be purified undergoes active circulation and purification while following a continuous path without leaving the primary container; as well as a purification process using the mechanism.

20 Claims, 14 Drawing Figures

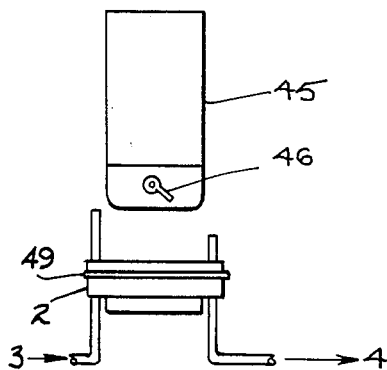
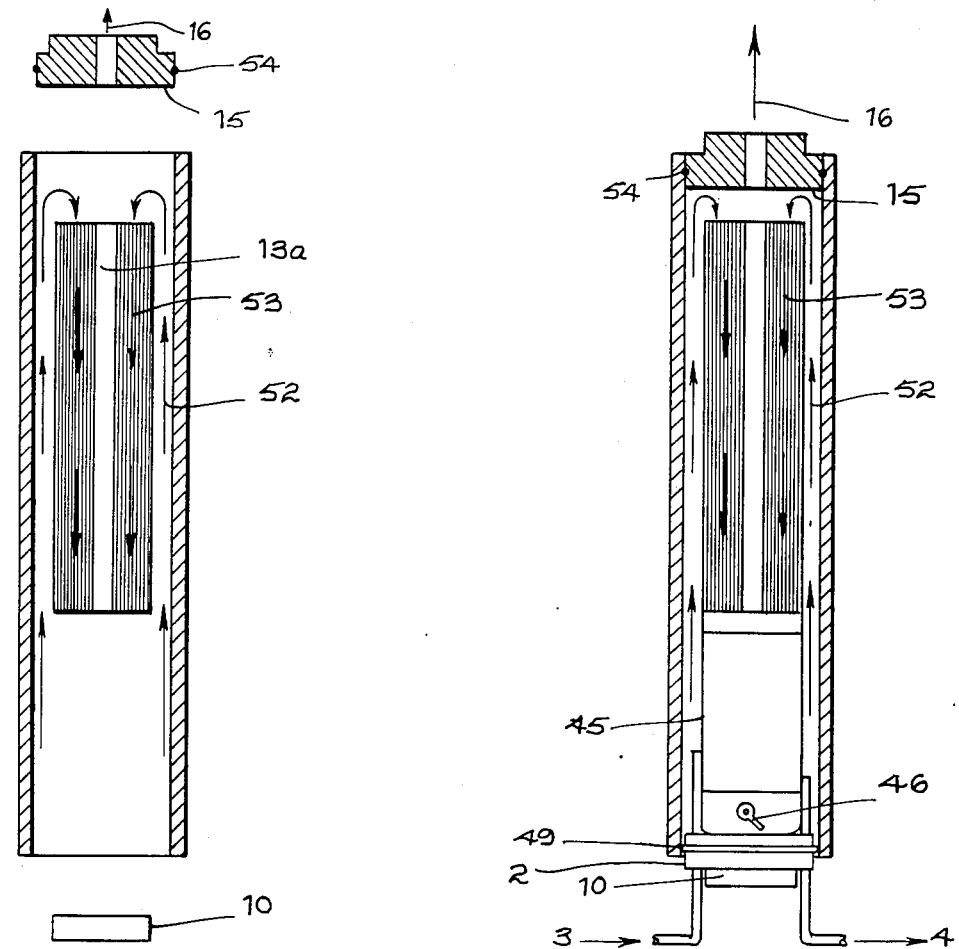
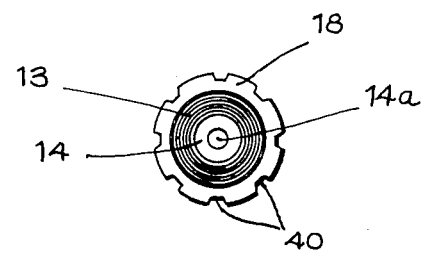
Fig. 8
Fig. 8a
Fig. 9

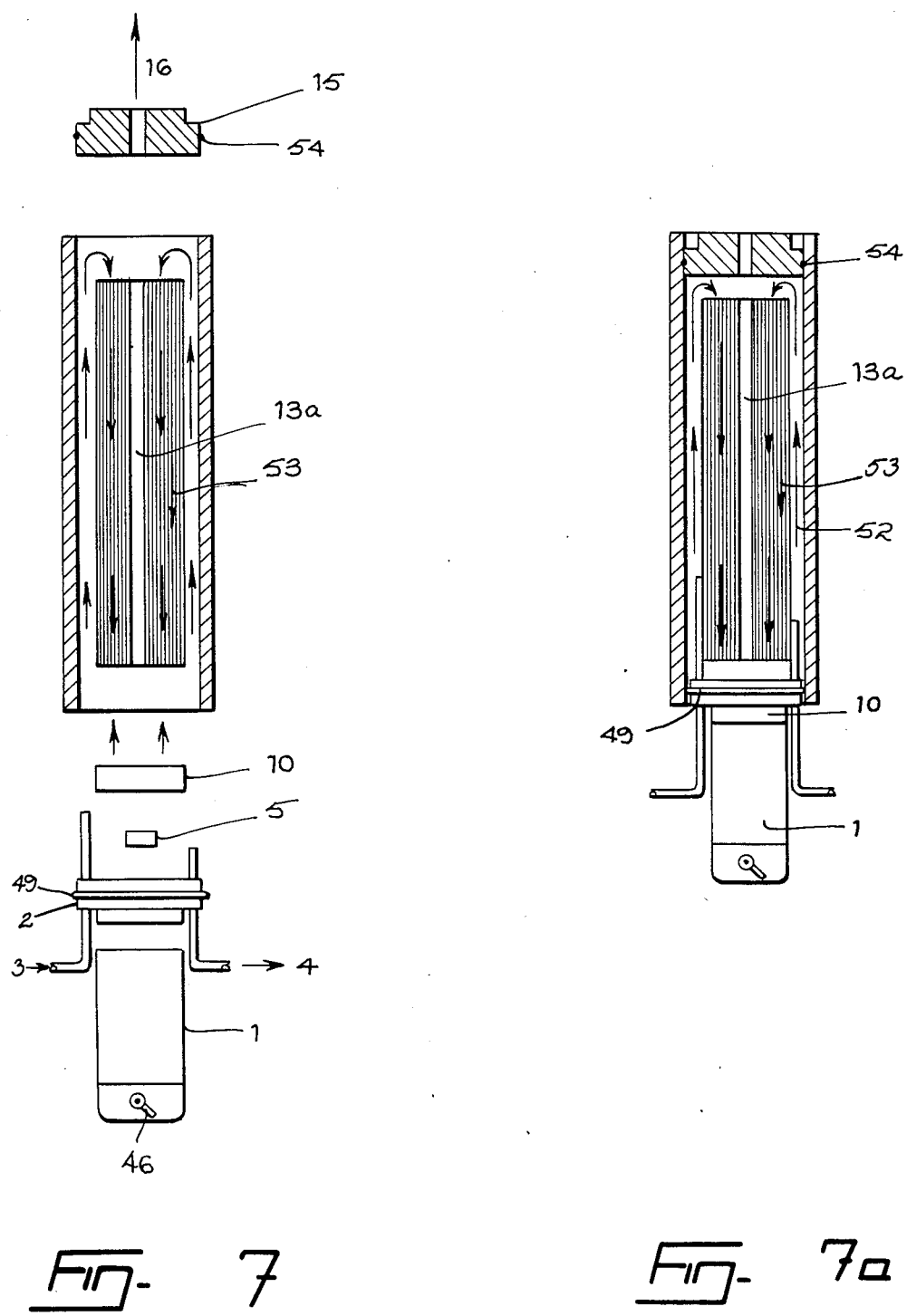

APPARATUS FOR REVERSE OSMOSIS USING FLUID RECIRCULATION

This invention relates to a membrane element pumping and circulation mechanism achieved by encasing a reverse osmosis or ultrafiltration membrane with an active circulation channel while providing an aqueous solution to be purified with a continuous path without leaving its primary container, (pressure vessel).

In many of the present reverse osmosis and ultrafiltration systems there are a number of pumps and interconnecting plumbing required to supply, pressurize, distribute and recirculate the fluids for processing. In the pressurized section of the conventional system, the circulation pump is normally located exteriorly to the membranes and is connected by standard plumbing connections. In specific applications the pump has been located in a cluster of membrane canisters, thus taking advantage of pressure within the enveloping canister. Such systems are therefore either very simplistic in design or very complex and require special housings and redistribution plumbing. Nevertheless they all require extra plumbing.

Canadian Pat. No. 1,030,074, issued Apr. 24, 1978 to Dorr-Oliver Inc. concerns a system and equipment design for housing and circulating fluids in a closed container. This application concerns primarily the housing arrangement and attachment of such housings within a rectangular container.

Canadian Pat. No. 1,050,439, issued Mar. 13, 1979 to BASF Wyandotte Corp, covers the general area of method and apparatus for purifying streams contaminated with organic materials. This approach describes a method of treating the reverse osmosis input stream by using another membrane type-ultrafiltration to clean or remove contaminants.

Canadian Pat. No. 1,119,970, issued to Allied Water Corporation on Mar. 16, 1982, covers a water purification process and system which contains a flow educator (circulator) that reduces the cost of circulating fluids within the membrane housing.

Canadian Pat. No. 979,374 issued to Aqua-Chem, Inc., on Dec. 9, 1975 deals with using a pressure vessel to house a high pressure feed pump. In addition, this pump is further connected with a complex baffle arrangement to circulate the fluid within the pressure vessel.

Canadian Pat. No. 1,040,544, issued Oct. 17, 1978 to Hoechst Aktiengesellschaft in Germany discloses various sized tubular reverse osmosis apparatus with membranes on both sides of concentric flow layer.

U.S. Pat. No. 4,395,130 issued Jul. 26, 1983 to Oleh Kutowy describes a dual interconnected pumping mechanism pump. This system is to provide both high pressure and low pressure circulation in a common pressure vessel and to eliminate leakage at high pressure seals and plumbing connections.

In spite of all the purported solutions to be found in these patents, the methods of circulating the aqueous solutions, optimizing the space occupied by the membrane and increased efficiencies by mechanical devices do not fulfill the concept nor intent of the present invention. The objective of this invention is to encase the reverse osmosis or ultrafiltration membrane with an active circulation channel and a special pump mechanism to provide the aqueous solution with a continuous path within its primary container commonly referred to as the pressure vessel.

An additional objective of the present invention is to provide a means to eliminate the problem of removing trapped bacteria and other foreign matter located in a dead area outside the membrane but inside the pressure vessel. Furthermore, the economies of fewer materials and lower operating cost can be realized in the present approach.

The invention provides a membrane element pumping and circulation mechanism, comprising:

(a) a cylindrical casing acting as a pressure vessel capable of withstanding reverse osmosis pressure;

(b) a centrifugal pumping mechanism, within, and at one end of, said pressure vessel, having an impeller driven by a driving means, and having a formed housing circumferentially perforated towards its pump end, so constructed as to provide 360 degree radial discharge and to provide high volume, low pressure flow;

(c) a first end plate support at the pump impeller end of the casing, in which fluid input and first output conduits are contained, said first end plate support also being sealingly joined to the casing by a coupling device;

(d) a second end plate support at the opposite end of the casing to the impeller end, said second end cap containing a second output conduit running from the interior side to the exterior side for exit of permeate, said second end cap being sealingly joined to the casing by a coupling device;

(e) a connector of smaller diameter than the casing sited immediately inside the casing and abutting, on one side, said second end plate support, said connector acting as a restraint mechanism and containing a longitudinal passageway; said connector being arranged so that its passageway is aligned with said second output conduit contained in said second end plate support so that unimpeded throughflow of fluid is possible;

(f) a membrane module of overall cylindrical shape of smaller diameter than the casing, but of larger diameter than the connector, said membrane module being held within the casing, at the pump impeller end by said formed impeller housing and, at the other end, by the other side of the connector so that a continuous space exists between the membrane module and the inside surface of the casing; said membrane module having a central, longitudinal passageway into which permeate passes, said membrane passageway being sealed at the impeller end by a sealing means and aligned at the connector end with said connector in such a manner that permeate may flow from said membrane passageway into the adjoining passageway of said connector;

wherein said input and first output conduits contained in said first end plate support are arranged in such a manner that fluid entering the input conduit is driven along the space between the membrane module and the inside surface of the casing, towards the connector end, where said fluid enters the membrane in which a first portion of the fluid passes into said membrane passageway as permeate which then passes through said connector passageway to said second output conduit, and a second portion of non-permeate fluid returns to the impeller through the membrane module so as to be removed as concentrate via the output conduit or to be recirculated by mixture with more incoming fluid.

An immediate benefit of this invention is the means of moving the fluid by a more efficient pumping mechanism which can discharge the fluid in a radial fashion and be unrestricted by the conventional discharge housing encasing centrifugal pumping mechanisms. Due to this fact, motor size is reduced and the efficiency of the pump impeller is increased.

In addition to providing increased circulation for large single membrane systems, the novel approach of the present invention lends itself to providing dual and multiple membrane systems with the capability of augmenting circulation without interferring with the primary flow through any of the other membrane supply channels. Initially, it was assumed that only small to medium size systems would benefit, but frequently the improvement also benefits systems where the last (or end) membranes suffer from reduction in flow.

The most obvious saving is derived from the absence of the circulation plumbing normally required in many small to large multi-membrane systems. In the high pressure systems such as desalination of seawater, the reduction in plumbing costs can become significant because materials used are primarily stainless metal alloys and are normally expensive.

An additional advantage of the present invention pertaining to multiple systems (where more than one membrane system is used) is that connections between membranes require only low strength plastics. This is because pressure differentials between the pressurized and recycled fluids are not excessive and normally are below 2.1 kg./sq.cm. (30 psi).

One of the important aspects of this invention is to maintain the systems free from bacteria. This is primarily to prevent contamination of the aqueous solution or fluid being separated but also to prevent deterioration or damage to the separation membrane itself. In the conventional systems, only complete removal of the membrane from its pressure vessel could assure full and proper cleaning, while the present invention guarantees a complete cleaning during normal washings of the membrane itself. In the pharmaceutical industry, this feature is an extremely critical factor in minimizing cross-contamination.

With the ability to house the pump mechanism internally and to connect the motor to the lower base pressure plate, there exists a further advantage of space reduction as well as the elimination of ancillary plumbing in confined locations. For example, small pleasure craft can use these systems without loss of space in very confined quarters.

The objects, advantages and other features of the present invention will become more apparent upon reading the following non-restrictive description of several preferred embodiments thereof, made with reference to the accompanying drawings; in which:

FIG. 5 is a cross-section along the line AA on FIG. 3;

FIG. 7 is the typical system layout and schematic flow diagram of an interior pump and exterior motor configuration before assembly;

FIG. 7a is the assembled system of FIG. 7;

FIG. 8 is the typical system layout and schematic flow diagram of an interior pump and motor configuration before assembly;

FIG. 8a is the assembled system of FIG. 8;

Figure 1:
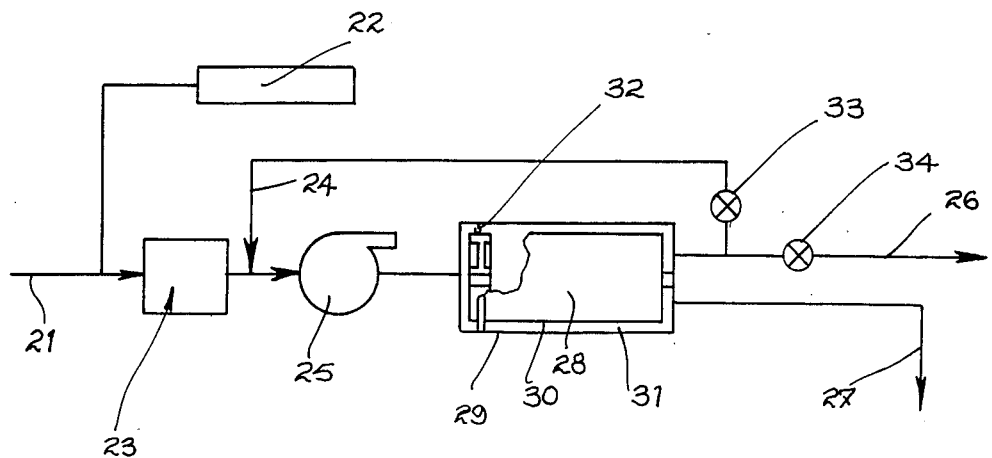
FIG. 1 is the schematic flow of a single pump single membrane system of the prior art.

As seen in the prior art system of FIG. 1, an aqueous feed (21) is chemically adjusted (22) for such reasons as pH control and passed through a 10 to 50 microns nominal size prefilter (23). Combined return flow (24) and fresh feed (21) are pressurized by a single pump (25) normally required to produce a high pressure. The aqueous solution passes through the membrane where it is separated into two streams—a concentrated stream (24) and (26) and a filtered stream (27) called permeate. The membrane forms part of a reverse osmosis module (28) encased by a fibreglass outer wrap (30) which resides in a pressure vessel (29), leaving a stagnant area (31) and sealed at one end by a U-cup brine seal (32) to prevent bypass. Control valves (33) and (34) are also shown.

The concentrate (24) and (26) exiting from the membrane may be directed back (24) to the intake of the pump (25) for further concentration before being released from the system. It is particularly important to note the function of the U-cup seal (32) to direct flow into the membrane and the resulting dead space (31) produced behind it.

Figure 2:
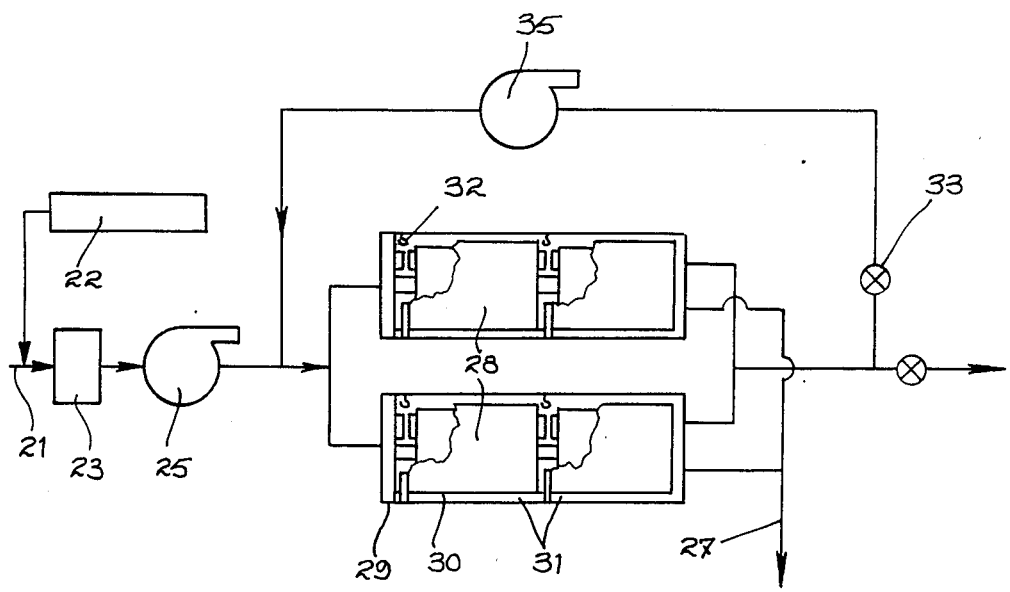
FIG. 2 is the schematic flow of a dual pumping multiple membrane system of the prior art.

As seen in the prior art system of FIG. 2, the addition of more membranes generates a need to add a further circulation pump (35) in order to reduce the size and horsepower requirements for the high pressure pump. The membrane configuration shown is a series/parallel system where more than a single element is located in each pressure vessel. The operational characteristics of these systems are very similar. Again, the presence of two or more U-cup seals (32) provides for several dead spaces (31). The remaining reference numerals in FIG. 2 are as explained for FIG. 1.

The essence of the present invention is to utilize the space between the membrane and the pressure vessel as the circulation path and to effect circulation by the pump located at the one end of the said vessel. The flow is effected by a conventional centrifugal pump driven by a power source, preferably a motor, which is usually electric.

Figure 3:
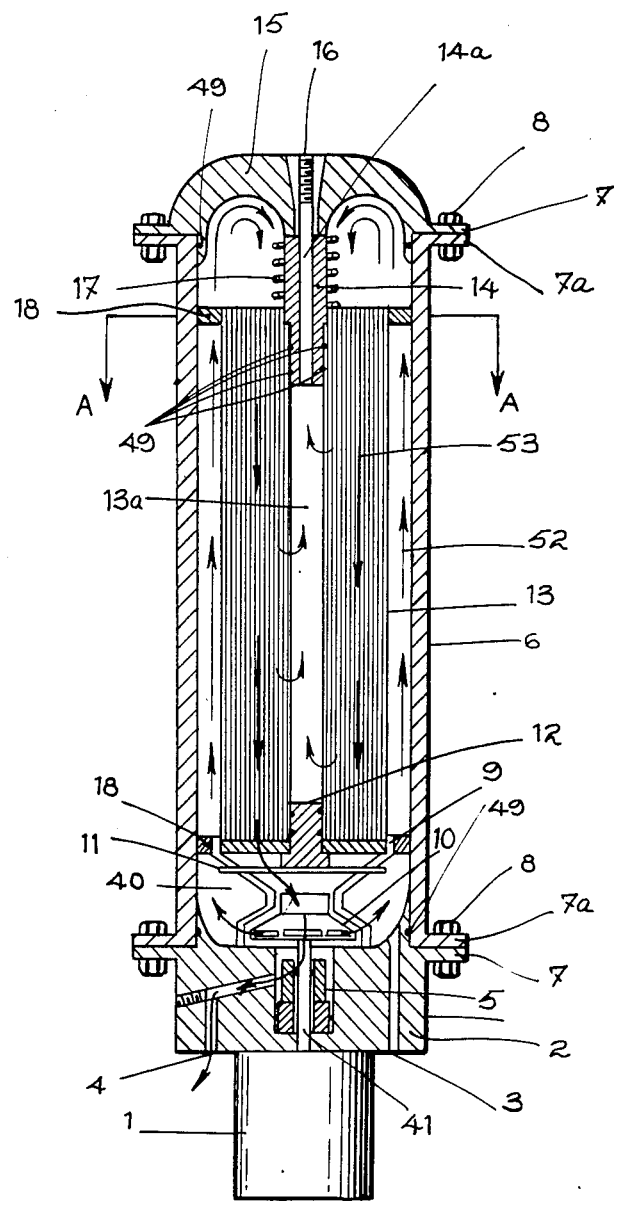
FIG. 3 is a cross-sectional view of the components of the system of the invention.

The very basic component parts of the invention are shown in FIG. 3, as follows. The electric motor (1) is mounted on one (first) end plate or cap (2) which is further machined to provide access for the input flow port (3), exit flow port (4) and the liquid seal (5). This end plate in internally shaped to improve flow characteristics. The motor (1) is connected directly to the pump by the motor shaft (41). The seal can be either mechanical or magnetic. The pressure vessel (6), preferably made of stainless steel, alloy metal or fibreglass is joined to the end plates (2) and (15) by a dual flange coupling device (7 and 7a) secured by bolts (8). The membrane module (13) rests on a molded plastic base (9) forming the pump housing which acts to direct the flow to the impeller of the pump (10). The bottom of the base is perforated to permit the pumped aqueous solution to be radially directed outwards from the center of the pump impeller. A support pin (11) is provided to restrain the end plug (12) from disengaging from the membrane (13). The top of the membrane is connected by a permeate connector (14) to the top (second) end plate or cap (15) and permits outflow through the permeate outlet (16). The inside surface of this end plate is shown to be formed as a demi-torus. This shape improves flow characteristics. A restraint mechanism (17) is provided to maintain pressure on the membrane module (13) to ensure that the module rests tightly against the impeller housing (9), in order that no fluid short-circuits the normal flow path. A spacer (18) maintains the proper space between the membrane and pressure vessel, (see also FIG. 5).

The basic description of the operation of the system can be best described by following the liquid path for a typical separation (or purification) procedure. As in the conventional system, the liquid enters the pressure vessel (6) under pressure through the entry port (3). Initially the fluid fills the cavity (40) and then at a particular pressure, the circulation pump is engaged. At this point the liquid moves upwards along the side wall (52) between the membrane and the inside surface of the pressure vessel to the top of the pressure vessel area. It now is drawn down through the membrane (13) itself, where part of the liquid is permitted to pass through the membrane (13) and thereby becomes two streams. One stream, called permeate, filtered by the membrane continues moving upward through the center tube or core (13a) of the membrane and out of the permeate outlet (16). The second stream, still inside the membrane called the concentrate, continues downward (53) to the pump impeller (10). Directed by the impeller, the fluid moves radially outward where it once again mixes with the incoming feed (3), moves to the top of the membrane and repeats its cycle. The concentrate is optionally removed at a fixed or variable rate through the exit port (4) to be passed on for further treatment or to be again concentrated by subsequent membrane systems.

Figure 4:
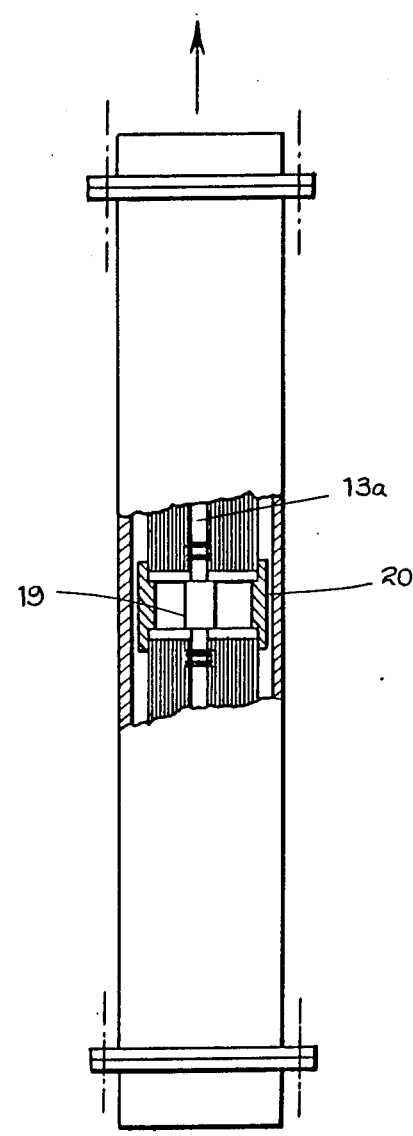
FIG. 4 is a schematic cross-sectional view of a series multiple membrane system of this invention.

A further preferred embodiment is shown in FIG. 4 resulting from adaptation of the above system to include two or more membranes in series. In this particular case, special connections are made between membranes to carry and keep separate the two distinct flows, the concentrate and the permeate. The permeate travels through the center core (13a) of the membranes and is passed through the intermembrane adapter (19). The concentrate is separated from the circulated flow by the membrane spacer-adapter (20). This modification takes advantage of a greater membrane surface exposure utilizing the same pressure vessel, circulation pump and motor.

FIG. 5 is a cross-section along the line AA on FIG. 3 and shows the indentations (40) in the annular spacer (18) which allow upward passage and therefore recirculation of fluid from the upward flow (52) outside the membrane (13) into the downward flow (53) inside the membrane (13). This cross section also shows the connector (14) and the connector core (14a) which connects the membrane core (13a) to the permeate outlet (16). Note that "upward" and "downward" refer to the orientation of the system portrayed in the Figures and are not intended to restrict the orientation of the invention in any way.

Figure 6:
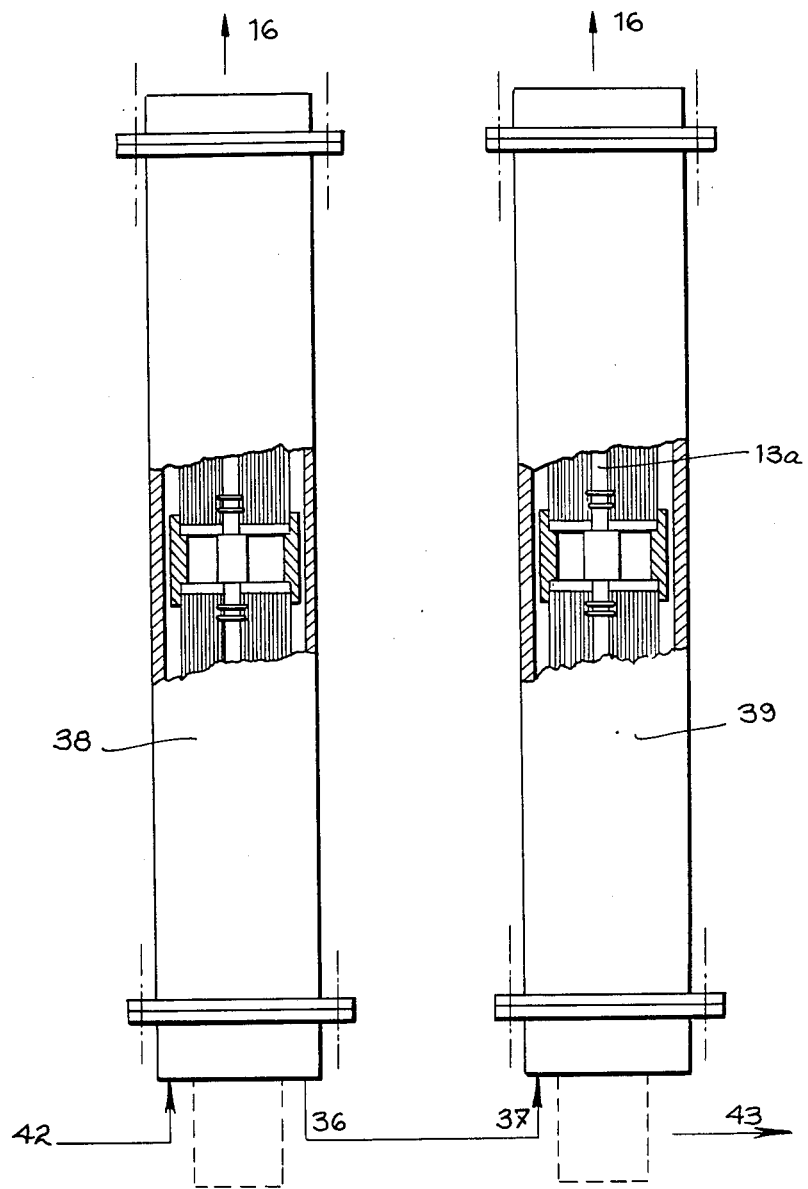
FIG. 6 is a schematic cross-sectional view of a series/parallel membrane system of this invention.

Membrane performance is affected by many factors such as temperature, pressure, membrane pore size, membrane composition and osmotic pressure of the aqueous solution. In the process of removing water to concentrate sugars for example, the degree of concentration or osmotic pressure affects the level at which each membrane can effectively allow water to pass through it. It is desirable to concentrate these sugars in stages to reduce the osmotic pressures at each stage and in turn increase membrane permeate output. Another embodiment of this invention takes advantage of this fact by simply joining several units in a series/parallel configuration as shown in FIG. 6. This permits the output (36) from the first unit (38) to enter as input (37) to the second (39) thereby maintaining a lower concentration in the first membrane series. The permeate leaves the two units as before according to the two arrows (16). The input to the first unit is labelled (42) and the output from the second unit is labelled (43). This embodiment enables the total system to maximize output using the same number of membranes as the conventional system as shown in FIG. 2.

FIGS. 7 and 7a diagrammatically show the invention in its most basic form with the (exterior) motor connected directly to the (interior) pump by the motor shaft (41)—see FIG. 3 for detail—extending through the end cap (2). Dependent upon the application and pressure requirements, the seal mechanism is chosen to prevent leakage outward from the system. FIGS. 7 and 7a show a motor (1) with electrical connections (46). The end cap (2) is sealed by an "O" ring (49) and is internally machined to carry the product input conduit (3) and the concentrate output conduit (4). The high pressure seal (5) surrounds the motor shaft (not shown) which connects to the pump head(10). The arrows (52) indicate the circulation flow outside the membrane, while arrows (53) show the circulation flow inside the membrane. Another "O" ring (54) seals the second end cap (15) which allows outward passage of the permeate (16). In the most general applications of this basic design, such as brackish water treatment, the required operating pressures can be as low as 17.6 kg/sq.cm. (250 psi) when leakage considerations are not considered critical.

In a modified form, and where leakage and or product loss is considered to be more important, the system can have both pump and motor housed inside the pressure vessel as shown, before assembly, in FIG. 8. This type of system could be employed in an application where precious metal recovery is required and leakages may be costly. In FIGS. 8 and 8a (assembled) the reference numerals have the same meanings as explained for FIG. 7 above.

Figures 9, 9A:
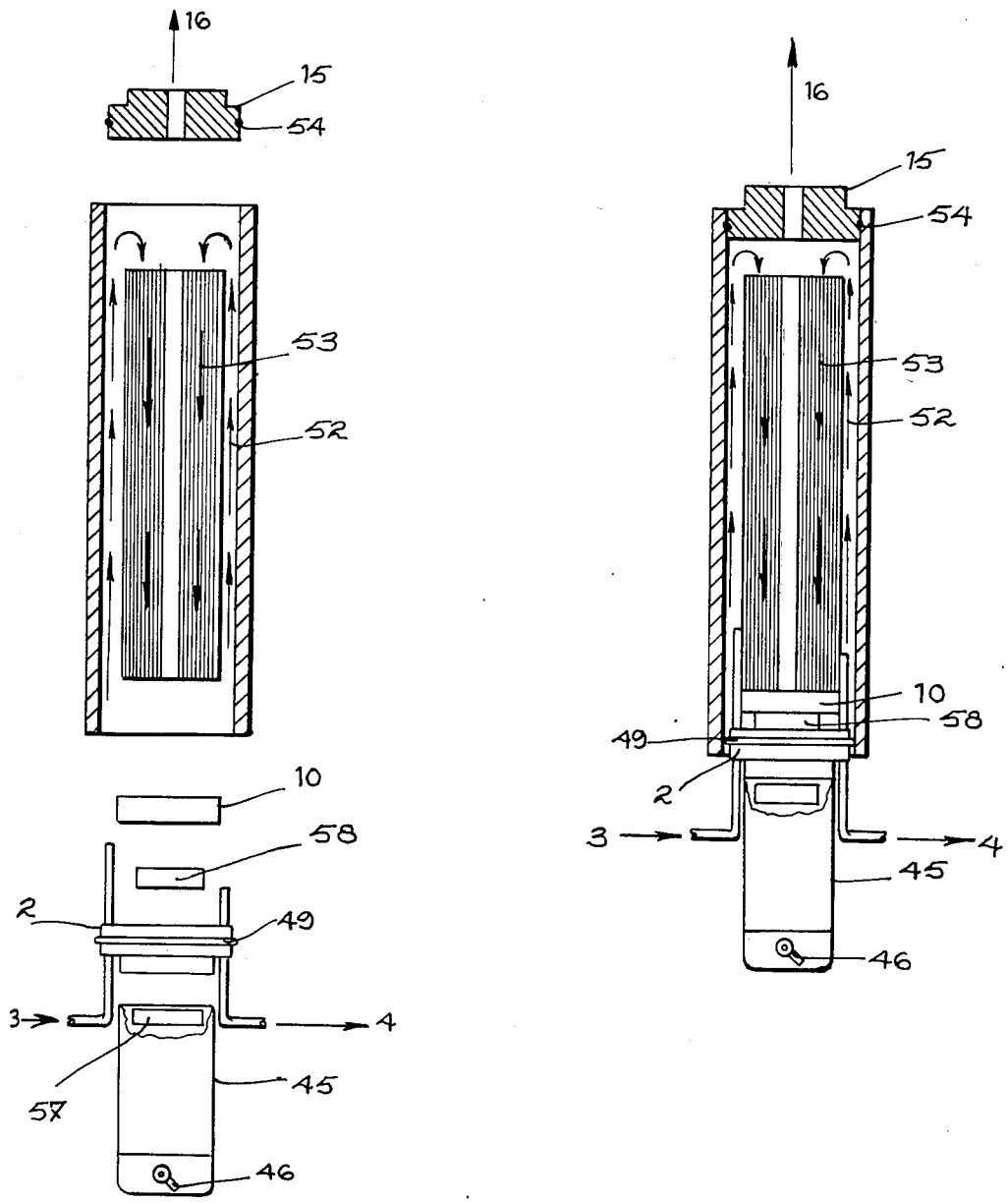
FIG. 9 is the typical system layout and schematic flow diagram of an interior pump and exterior motor magnetic drive configuration before assembly.
FIG. 9a is the assembled system of FIG. 9.

In the third basic modification, the motor drives the pump through the use of a magnetic coupling shown in FIG. 9 (before assembly) and 9a (after assembly). This method permits the system to operate in situations where corrosive fluids are being separated and where leakages may be undesirable under all circumstances. In FIG. 9, a magnetic drive head (57) is contained within the motor unit (1). A magnetic pump head (58) is driven by the motor rotating the drive head (57). The remaining reference numerals in FIG. 9 have the same meanings as indicated for FIGS. 7 and 8 above.

Other types of driving means and power source may be used and the invention is not restricted in any way from accepting or using them and should be understood as including such other connections.

However, the preferred driving means is a rotatable shaft (axle) running through the first end plate and sealed by an appropriate rotating seal common in the art and shown in FIG. 3. However, in the case where the power source (motor) is physically separate from the impeller (FIGS. 9 and 9a) the driving means may be a magnetically responsive disc (58) attached to the impeller and driven externally by a rotating magnet (57) attached to the motor.

The motor and pump assembly is connected directly onto the base-plate (first end cap) of the pressure vessel which in turn is connected to the pressure vessel by a coupling mechanism described below.

The pressure vessel component parts are typical of those used in the industry but that should not imply that other parts cannot be used. The pump assembly is situated at one end of the membrane and may also provide a seal at the same end, as well as providing a housing for the pump impeller. Various impellers are employed to provide the flow characteristics to meet the specifications of the membrane or combinations of membranes. The entire equipment assembly can function in any position but is shown in the Figures, for descriptive purposes only, in the vertical position. Access to the membrane can take place through the top or the bottom of the pressure vessel. There are basically three connections made to the assembly which serve to provide the following fluid flows. Referring to FIG. 3, one inlet (3) is for the supply of aqueous solution to the system, one (4) for the return of the concentrated aqueous solution and one (16) for the release of treated or purified aqueous component of the solution.

The invention is designed to accommodate various preferred aspects of membrane separation technology requirements. Typically some of these requirements are distinct operating pressures that can vary from 2.8 to 84.4 kg.cm$^{-2}$ (40 to 1200 psi), however this should not imply that the invention is restricted to this range since appropriate choice of materials, as noted above, renders this invention suitable for use at any prevailing ultrafiltration or reverse osmosis pressure. Other such requirements met by the present invention include: minimal to no leakage; distinct membrane types for processing and protection against contamination by bacteriological presence.

In another preferred embodiment, the invention may be used in one of the following three ways: with pump inside and motor located outside the pressure vessel (FIGS. 7 and 7a); pump and motor located inside the pressure vessel (FIGS. 8 and 8a); or completely separated by a magnetic coupling (FIGS. 9 and 9a).

In still another preferred embodiment of the invention, the invention can be subjected to cleaning agents and be properly cleaned without the removal of membranes and other internal component parts.

In yet another preferred embodiment of the invention (see FIG. 4), several membranes can be located within the same pressure vessel to reduce both plumbing and other necessary connections found in conventional systems.

In another preferred adaptation of the system configuration, several duplicate systems according to the invention may be combined in series and/or parallel to take further advantage of special applications of membrane processes and again improve upon productivity and economy in such applications, see FIG. 6.

The pressure vessel is sealed at both ends by end plates or end caps, (2) and (15) in the Figures. These end caps may be attached to, or retained by, the casing in a variety of ways and may incorporate a variety of sealing mechanisms.

Furthermore the end plates may fit inside the casing instead of being flush with the end of the casing as shown in the Figures. The inside surface of either end plate may be shaped in order to encourage directional flow of the circulating fluids. A preferred interior shape to the end cap at the connector end is a demi-torus (or a dual domed shape when viewed in cross section) similar to an inverted Viennese cake tray, as seen in FIG. 3.

The end plates are secured to the casing by a coupling device which may be of any acceptable design but which preferably consists of a dual flange (7 and 7a) system (see FIG. 3) whereby the end cap (2) or (15) carries a flange (7) which corresponds to a flange (7a) on the end of the casing (6). When joined in this way the end cap (2) or (15) and casing (6) are retained by bolts (8). The end cap in this system carries an O-ring seal (49).

Figure 10:
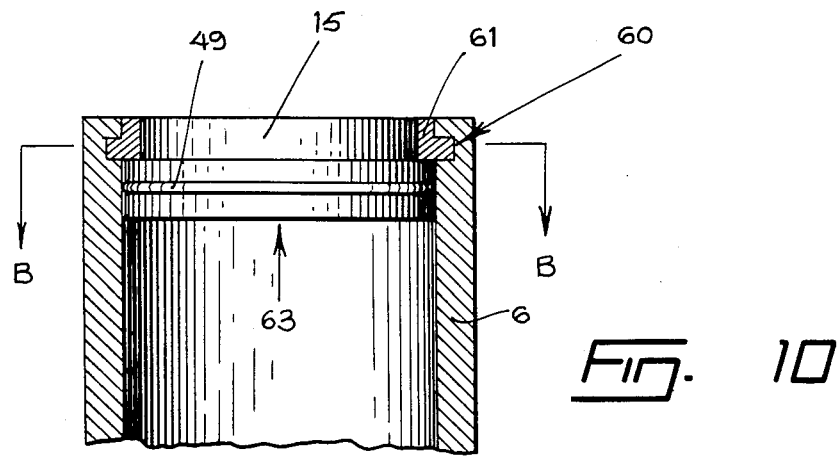
FIG. 10 shows detail of the connector end of the pressure vessel showing one method of attachment.
Figure 10A:
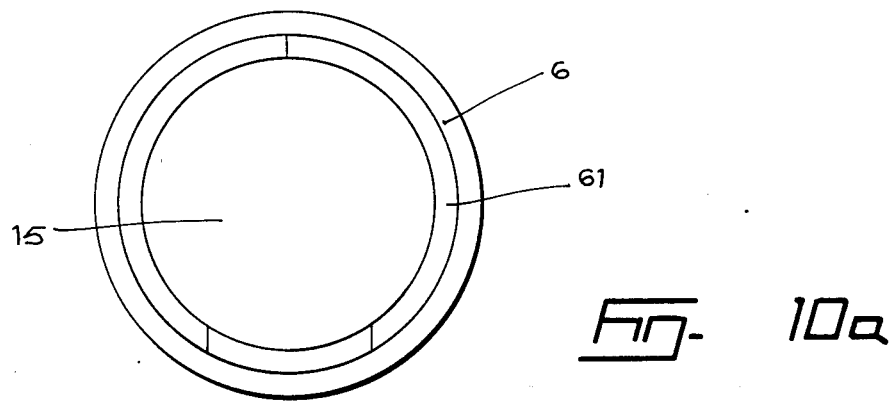
FIG. 10a is a cross-section along the line BB' on FIG. 10.

Another preferred way to retain the end caps is by use of a conventional split ring system (FIG. 10 and 10a) involving the end cap (15) being at least partially inserted inside the casing (6), the casing (6) in turn having a groove (60) round its inside circumference, towards the end of the casing (6), to accommodate the split ring (61) which is formed from three pieces. In such a system, the end cap (15) carries an O-ring seal (49) and is held in position by the pressure (63) inside the casing. FIG. 10a is a cross-section along the line BB of FIG. 10.

A third preferred means of attaching the end cap is by use of a victolic coupling, which by its design (known in the art) incorporates a seal within the coupling.

The cylindrical casing is most preferably made of stainless steel but other preferred materials are fibreglass and plastic. The material is chosen according to at what pressures the system is intended for use.

The end caps are preferably made from aluminum.

The connector (14)—see FIG. 3—(connecting the central membrane core (13a) with the permeate outflow conduit (16) may operate also as a restraint mechanism to hold the membrane module (13) firmly seated in the formed impeller housing (9). It is an option of the present invention that a supplementary restraint mechanism, such as a coil spring (17), may be provided to supply additional pressure from the connector end onto the membrane module, thus ensuring that the module is firmly held.

It is also an option of the present invention that the membrane module be further stabilized if necessary by using one or more annular perforated spacers (18) between the membrane module and the inside surface of the casing, see particularly FIG. 5.

What is claimed is:

1. A membrane element pumping and circulation mechanism, comprising:
    (a) a cylindrical casing acting as a pressure vessel capable of withstanding reverse osmosis pressure;
    (b) a centrifugal pumping mechanism, within, and at one end of, said pressure vessel, having an impeller driven by a driving means, and having a formed housing circumferentially perforated towards its pump end, so constructed as to provide 360 degree radial discharge and to provide high volume, low pressure flow;

(c) a first end plate support at the pump impeller end of the casing, in which fluid input and first output conduits are contained, said first end plate support also being sealingly joined to the casing by a coupling device;

(d) a second end plate support at the opposite end of the casing to the impeller end, said second end cap containing a second output conduit running from the interior side to the exterior side for exit of permeate, said second end cap being sealingly joined to the casing by a coupling device;

(e) a connector of smaller diameter than the casing sited immediately inside the casing and abutting, on one side, said second end plate support, said connector acting as a restraint mechanism and containing a longitudinal passageway; said connector being arranged so that its passageway is aligned with said second output conduit contained in said second end plate support so that unimpeded throughflow of fluid is possible;

(f) a membrane module of overall cylindrical shape of smaller diameter than the casing, but of larger diameter than the connector; said membrane module being held within the casing, at the pump impeller end by said formed impeller housing and, at the other end, by the other side of the connector so that a continuous space exists between the membrane module and the inside surface of the casing; said membrane module having a central, longitudinal passageway into which permeate passes, said membrane passageway being sealed at the impeller end by a sealing means and aligned at the connector end with said connector in such a manner that permeate may flow from said membrane passageway into the adjoining passageway of said connector;

wherein said input and first output conduits contained in said first end plate support are arranged in such a manner that fluid entering the input conduit is driven along the space between the membrane module and the inside surface of the casing, towards the connector end, where said fluid enters the membrane in which a first portion of the fluid passes into said membrane passageway as permeate which then passes through said connector passageway to said second output conduit, and a second portion of non-permeate fluid returns to the impeller through the membrane module so as to be removed as concentrate via the output conduit or to be recirculated by mixture with more incoming fluid.

2. A mechanism as claimed in claim 1, wherein the inside surface of at least one end plate support is formed to encourage directional flow of the circulating fluids.

3. A mechanism as claimed in claim 2, wherein the inside surface of said second end plate support is formed in the shape of a demi-torus.

4. A mechanism as claimed in claim 1, wherein said coupling device joining at least one of said end plate supports to the casing is a dual flange system.

5. A mechanism as claimed in claim 1, wherein said coupling device is a split ring system.

6. A mechanism according to claim 1, wherein said coupling device is a victolic coupling.

7. A mechanism as claimed in claim 1, wherein the casing is made from a material selected from stainless steel, fiber glass and plastic.

8. A mechanism as claimed in claim 1, wherein a supplementary restraint mechanism is incorporated inside the casing at the connector end so that the membrane module is held in position.

9. A mechanism as claimed in claim 1, wherein the membrane module is held away from the inside surface of the casing by one or more perforated annular spacers.

10. A mechanism according to claim 1, operating at a pressure ranging from 40-1200 psi.

11. A mechanism according to claim 1, wherein the pump is inside the casing and a motor as driving means is outside.

12. A mechanism according to claim 1, wherein both the pump and a motor as driving means are positioned inside the casing.

13. A mechanism according to claim 11, wherein the pump impeller is attached to a magnetically responsive disc which is driven by a magnetic coupling attached to a power source.

14. A mechanism system according to claim 1, wherein the interior of the system may be cleaned without removal of internal components.

15. A multiple membrane system comprising at least two mechanisms according to claim 1.

16. A membrane mechanism according to claim 1, wherein said membrane module consists of at least two sub-modules in series contained by the same pressure vessel said submodules joined in such a way that the permeate travels continuously from one sub-module to the next via an inter membrane adaptor, joining the respective passageways of the units; and wherein the concentrate is separated from the circulated flow by a membrane spacer adapter so that the concentrate flows continuously from one sub-module to the next without mixing with the circulated flow.

17. A multiple membrane system comprising at least two mechanisms according to claim 16.

18. A process for the purification of aqueous solutions using the apparatus according to claim 1.

19. A process for the purification of aqueous solutions using the apparatus according to claim 15.

20. A process for the purification of aqueous solutions using the apparatus according to claim 16.

* * * * *